(12) United States Patent
Iwaki et al.

(10) Patent No.: US 10,771,656 B2
(45) Date of Patent: Sep. 8, 2020

(54) INFORMATION PROCESSING DEVICE AND RECORDING MEDIUM

(71) Applicant: FUJI XEROX CO., LTD., Tokyo (JP)

(72) Inventors: Kaori Iwaki, Kanagawa (JP);
Masahiko Kubo, Kanagawa (JP);
Toshifumi Takahira, Kanagawa (JP);
Yosuke Tashiro, Yokohama (JP);
Kaoru Yamauchi, Kanagawa (JP);
Ayako Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/722,571

(22) Filed: Dec. 20, 2019

(65) Prior Publication Data

US 2020/0128150 A1    Apr. 23, 2020

Related U.S. Application Data

(63) Continuation of application No. 16/110,455, filed on Aug. 23, 2018, now Pat. No. 10,554,859.

(30) Foreign Application Priority Data

Apr. 3, 2018   (JP) .................................. 2018-071770

(51) Int. Cl.
*H04N 1/60*   (2006.01)

(52) U.S. Cl.
CPC ......... *H04N 1/6025* (2013.01); *H04N 1/6008* (2013.01)

(58) Field of Classification Search
CPC ........................... H04N 1/6025; H04N 1/6008
USPC ......................................................... 358/523
See application file for complete search history.

(56) References Cited

U.S. PATENT DOCUMENTS

| 6,389,260 | B1 ‡ | 5/2002 | Kataoka | G03G 15/0194 |
| | | | | 399/298 |
| 8,702,225 | B2 ‡ | 4/2014 | Kachi | B41J 11/002 |
| | | | | 347/102 |
| 2005/0243335 | A1* | 11/2005 | Giesselmann | H04N 1/6033 |
| | | | | 358/1.9 |
| 2007/0133032 | A1* | 6/2007 | Robinson | G03G 15/5016 |
| | | | | 358/1.14 |
| 2008/0079977 | A1* | 4/2008 | van de Capelle | G06F 3/1205 |
| | | | | 358/1.13 |
| 2011/0063641 | A1 ‡ | 3/2011 | Fukuda | H04N 1/52 |
| | | | | 358/1.9 |
| 2011/0221810 | A1 ‡ | 9/2011 | Tamai | B41J 2/2117 |
| | | | | 347/12 |

(Continued)

FOREIGN PATENT DOCUMENTS

JP     2016-129990 A   ‡  7/2016
JP     2016-129990 A      7/2016

*Primary Examiner* — Allen H Nguyen
(74) *Attorney, Agent, or Firm* — Oliff PLC

(57) ABSTRACT

An information processing device includes: an image acquirer that acquires an image to print onto a medium; a color converter that converts color in the image acquired by the image acquirer depending on a positional relationship between a white image forming section that forms an image on the medium with white color material and a color image forming section that forms an image on the medium with colored color material; and an image output unit that outputs the image whose color is converted by the color converter.

13 Claims, 13 Drawing Sheets

(56) References Cited

U.S. PATENT DOCUMENTS

2013/0278660 A1‡ 10/2013 Tsuji ............... B41J 2/2132
                                                      347/14
2016/0342121 A1‡ 11/2016 Itoh ............... G03G 15/6585
2018/0246435 A1‡  8/2018 Ebe ............... G03G 15/1615

\* cited by examiner
‡ imported from a related application

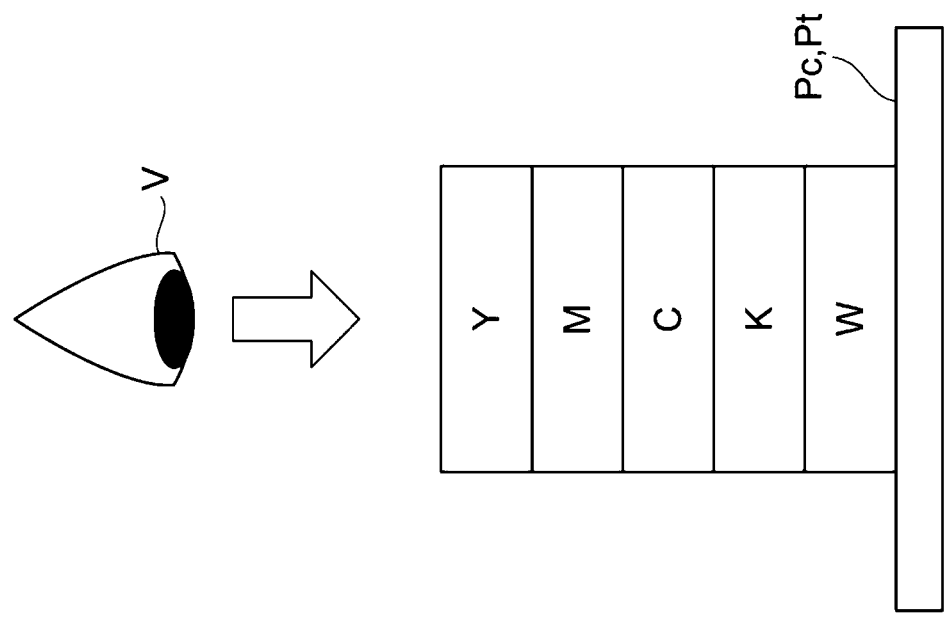
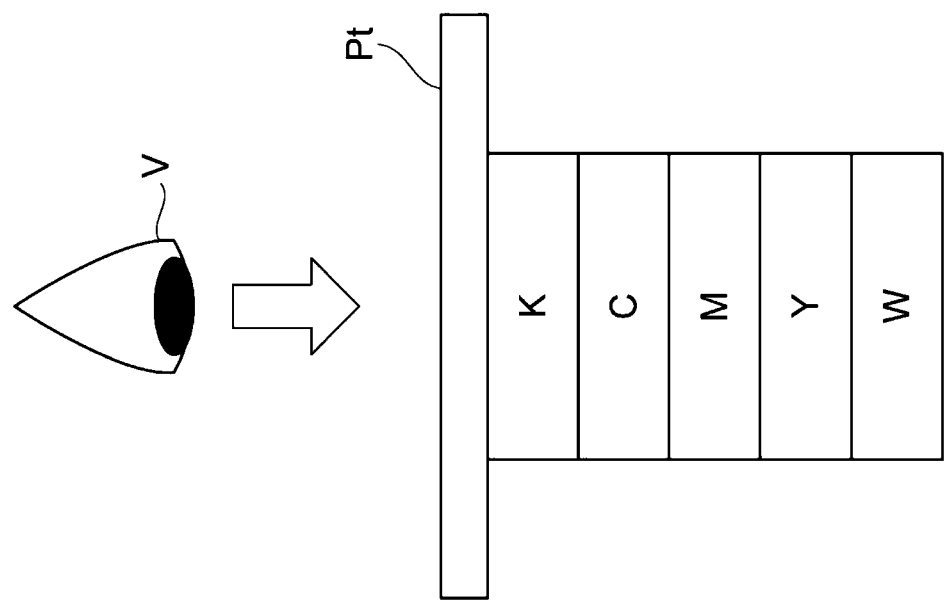

INFORMATION PROCESSING DEVICE AND RECORDING MEDIUM

CROSS-REFERENCE TO RELATED APPLICATIONS

This application is a continuation of U.S. application Ser. No. 16/110,455 filed Aug. 23, 2018, which is based on and claims priority under 35 USC 119 from Japanese Patent Application No. 2018-071770 filed Apr. 3, 2018.

BACKGROUND

Technical Field

The present invention relates to an information processing device and a recording medium.

SUMMARY

According to an aspect of the invention, there is provided an information processing device including: an image acquirer that acquires an image to print onto a medium; a color converter that converts color in the image acquired by the image acquirer depending on a positional relationship between a white image forming section that forms an image on the medium with white color material and a color image forming section that forms an image on the medium with colored color material; and an image output unit that outputs the image whose color is converted by the color converter.

BRIEF DESCRIPTION OF THE DRAWINGS

An exemplary embodiment of the present invention will be described in detail based on the following figures, wherein:

FIGS. 4A and 4B are diagrams illustrating a print order of a white toner image when forming an image on a medium by the image forming device according to an exemplary embodiment of the present invention;

DETAILED DESCRIPTION

Hereinafter, an exemplary embodiment of the invention will be described in detail and with reference to the attached drawings.

[Overall Configuration of Image Forming System]

Figure 1:
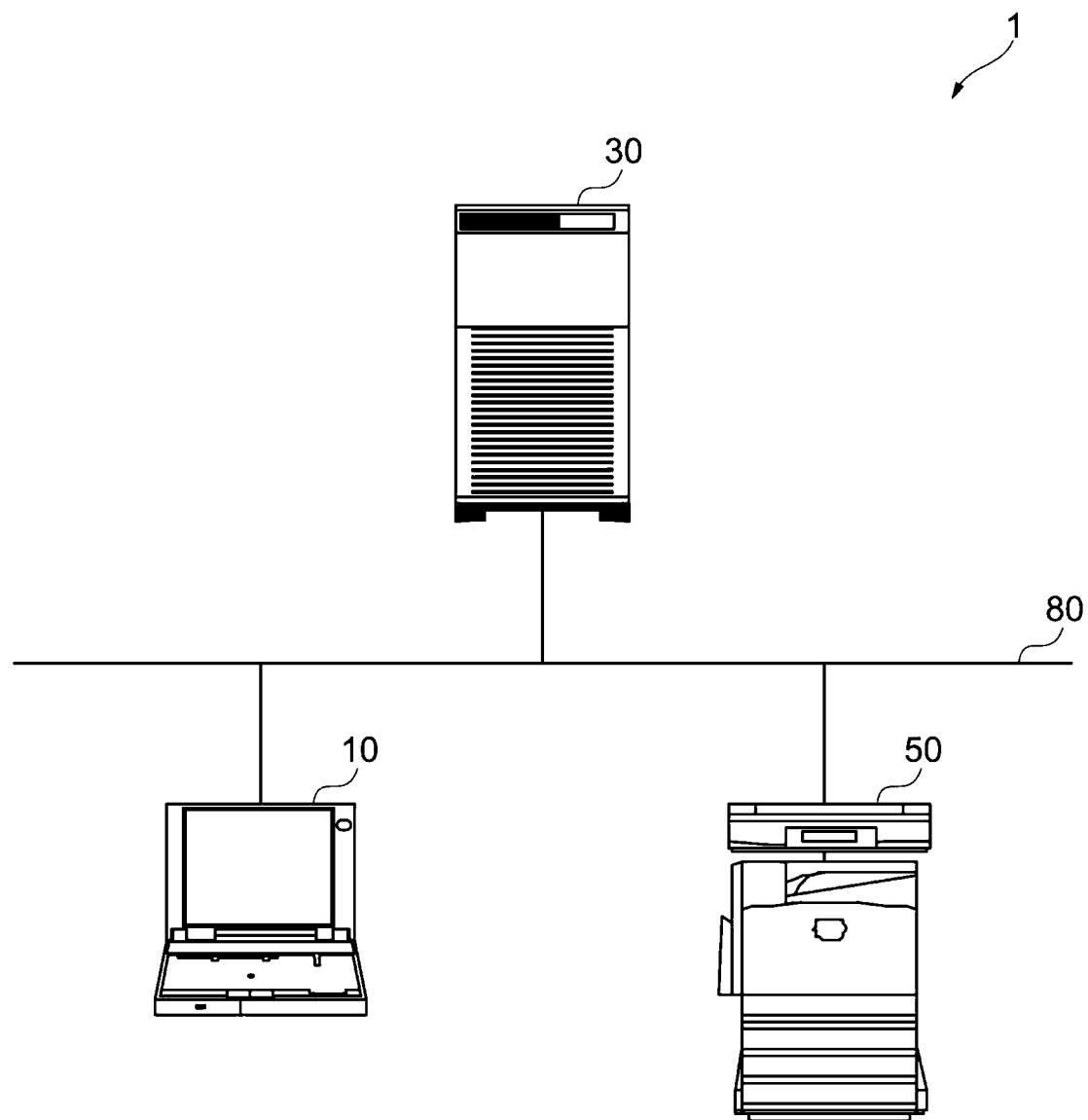
FIG. 1 is a diagram illustrating an exemplary overall configuration of an image forming system applying an exemplary embodiment of the present invention.

FIG. 1 is a diagram illustrating an exemplary overall configuration of an image forming system 1 applying an exemplary embodiment. As illustrated, the image forming system 1 is configured by interconnecting a terminal device 10, a print server 30, and an image forming device 50 via a communication link 80. Note that the diagram only illustrates a single terminal device 10, print server 30, and image forming device 50, but multiple terminal devices 10, print servers 30, and image forming devices 50 may also be provided.

The terminal device 10 is a computer device used to issue instructions for printing on the image forming device 50. Specifically, document data or the like to be printed is created by causing a document creation application or the like to operate. Additionally, by causing a printer driver corresponding to the print server 30 to operate, print instruction data giving instructions for printing the document data or the like is created and sent to the print server 30. The print instruction data may be PDL data written in a page description language (PDL), or may be preliminary data to be converted into PDL data. Herein, a desktop PC, notebook PC, or the like is favorably used as the terminal device 10.

The print server 30 receives print instruction data from the terminal device 10, and accumulates the data as print data to be used for printing on the image forming device 50. If the print instruction data is PDL data, it is sufficient to perform processing such as rasterization and color conversion on the PDL data and accumulate the result as print data, or if the print instruction data is preliminary data to be converted into PDL data, it is sufficient to convert the preliminary data into PDL data first, and after that, perform processing such as rasterization and color correction, and accumulate the result as print data. Subsequently, when there is a request to print the document data or the like from the image forming device 50, the print data is transmitted to the image forming device 50. Alternatively, the terminal device 10 may specify the image forming device 50 as an output destination, and thereby transmit the print data to the image forming device 50 without waiting for a print request from the image forming device 50. Also, the print server 30 manages the type of medium contained in a medium container of the image forming device 50. In the present exemplary embodiment, the print server 30 is provided as one example of an information processing device.

The image forming device 50 is a device that forms an image of document data or the like on a medium. The image forming device 50 may be equipped with only the functions of a printer, or additionally may be equipped with the functions of a scanner and a facsimile machine. Herein, an electrophotographic system may be used as the image forming method in the image forming device 50, for example, but another method may also be used.

[Hardware Configuration of Terminal Device and Print Server]

Figure 2:
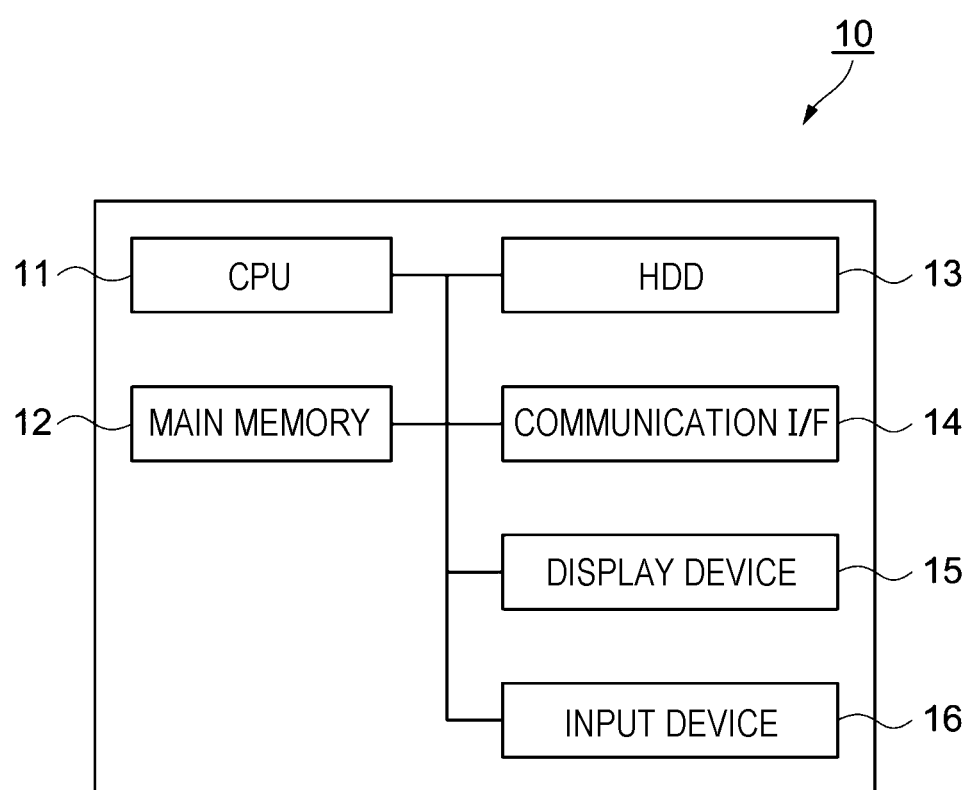
FIG. 2 is a diagram illustrating an exemplary hardware configuration of a terminal device according to an exemplary embodiment of the present invention.

FIG. 2 is a diagram illustrating an exemplary hardware configuration of the terminal device 10 according to the present exemplary embodiment. As illustrated, the terminal device 10 is provided with a CPU 11, main memory 12, an HDD 13, a communication interface (denote "communication I/F" in the diagram) 14, a display device 15, and an input device 16.

The CPU 11 realizes the functions of the terminal device 10 by loading various programs stored in the HDD 13 into the main memory 12 and executing the programs, for example.

The main memory 12 is memory used as work memory or the like for the CPU 11, for example.

The HDD 13 is memory that stores various programs executed by the CPU 11, data created or acquired by the terminal device 10, and the like.

The communication I/F 14 transmits and receives various information to and from other devices via the communication link 80.

The display device 15 is a device that displays various information output from the terminal device 10 internally. Herein, a liquid crystal display may be used as the display device, for example.

The input device 16 is a device that receives information input by the user, and inputs the information into the terminal device 10 internally.

In addition, the hardware configuration illustrated in FIG. 2 may also be treated as a hardware configuration of the print server 30. However, when describing the print server 30, each of the CPU 11, the main memory 12, the HDD 13, the communication interface 14, the display device 15, and the input device 16 in FIG. 2 will be denoted as the CPU 31, the main memory 32, the HDD 33, the communication I/F 34, the display device 35, and the input device 36, respectively.

[Overall Configuration of Image Forming Device]

Figure 3:
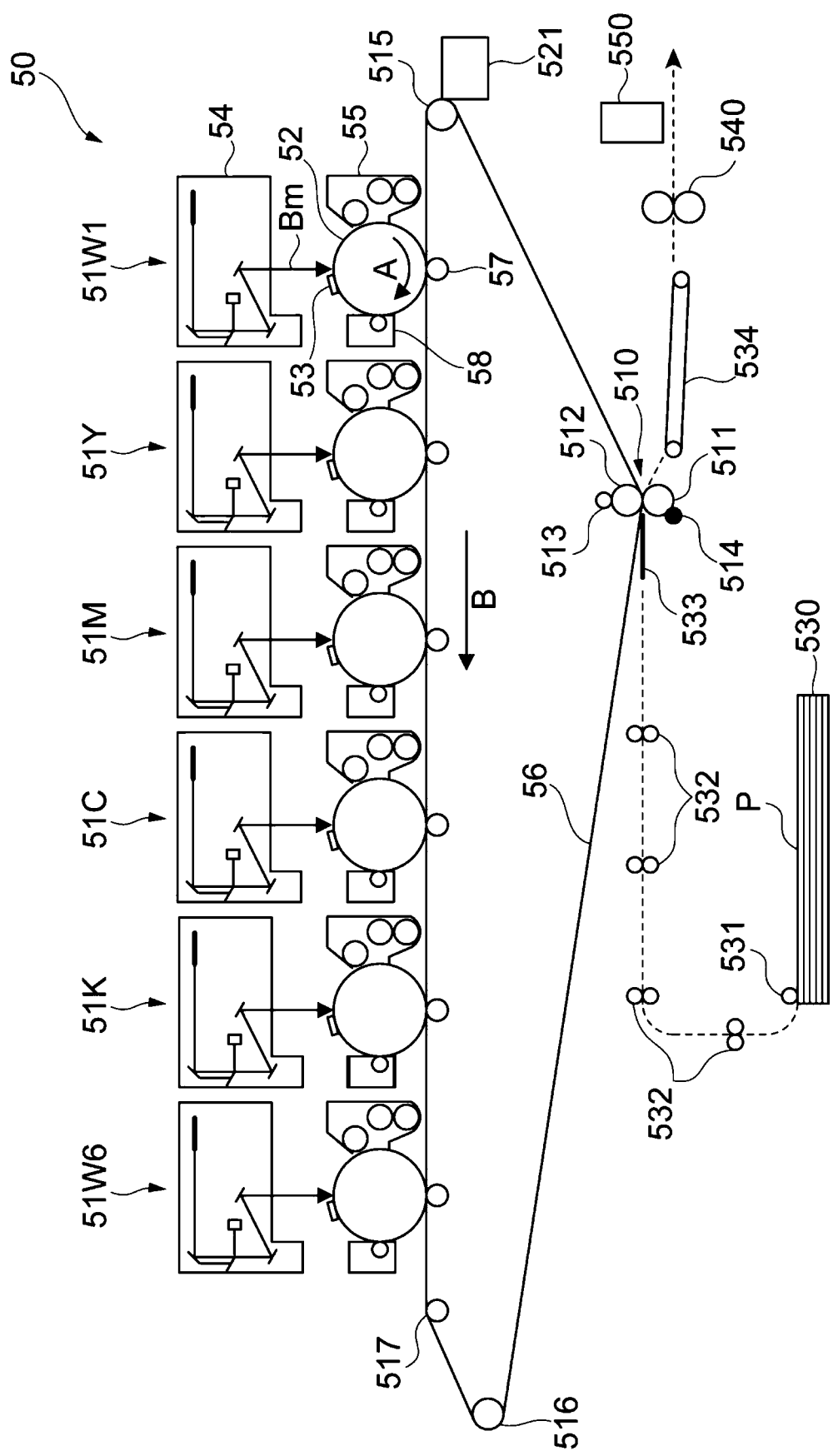
FIG. 3 is a block diagram illustrating an exemplary overall configuration of an image forming device according to an exemplary embodiment of the present invention.

FIG. 3 illustrates an exemplary overall configuration of the image forming device 50 according to the present exemplary embodiment. The image forming device 50 is what is called a tandem device, and for example, is provided with multiple image forming units 51 (51W1, 51Y, 51M, 51C, 51K, 51W6) in which a toner image of each color component is formed by an electrophotographic system, an intermediate transfer belt 56 that successively transfers (a first transfer) and holds each color component toner image formed by each image forming unit 51, a secondary transfer device 510 that performs a lump transfer (secondary transfer) of the layered image transferred on the intermediate transfer belt 56 onto a medium P, a fusing device 540 that fuses the secondarily transferred image onto the medium P, and a colorimetric sensor 550 that measures color-related features from the toner image fused onto the medium P.

In the image forming device 50, besides the image forming units 51Y, 51M, 51C, and 51K that form toner images of the common colors (ordinary colors), namely yellow (Y), magenta (M), cyan (C), and black (K), two image forming units 51W1 and 51W6 that form toner images of white (W) are provided as image forming units included in the tandem.

Note that the image forming units 51W1 and 51W6 will be designated the image forming units 51W when not being distinguished.

In each image forming unit 51 (51W1, 51Y, 51M, 51C, 51K, 51W6) of the present exemplary embodiment, around a photoreceptor drum 52 that rotates in the direction of the arrow A, electrophotographic devices such as a charger 53 that charges the photoreceptor drum 52, a laser exposure device 54 that writes an electrostatic latent image onto the photoreceptor drum 52 (in the diagram, the exposure beam is labeled by the sign Bm), a developer 55 that contains toner of each color component toner and causes the electrostatic latent image on the photoreceptor drum 52 to become a visible image by the toner, a first transfer roller 57 that transfers each color component toner image formed on the photoreceptor drum 52 onto the intermediate transfer belt 56, and a drum cleaner 58 that removes residual toner on the photoreceptor drum 52 are successively disposed. These image forming units 51 are disposed in order of the colors white (W), yellow (Y), magenta (M), cyan (C), black (K), and white (W) from the upstream side of the intermediate transfer belt 56.

Also, the intermediate transfer belt 56 is configured to be rotatable in the direction of the arrow B in the diagram by various rollers. The various rollers include a drive roller 515 driven by a motor (not illustrated) that causes the intermediate transfer belt 56 to rotate, a tension roller 516 equipped a function of imparting a constant tension to the intermediate transfer belt 56 while also keeping the intermediate transfer belt 56 from meandering, an idle roller 517 that supports the intermediate transfer belt 56, and a backup roller 512 (described later).

Also, a voltage of opposite polarity to the charging polarity of the toner is applied to the first transfer roller 57, thereby causing the toner image on each of the photoreceptor drums 52 to be successively attracted by electrostatic force to the intermediate transfer belt 56, and causing a layered toner image to be formed on the intermediate transfer belt 56.

Furthermore, the secondary transfer device 510 is provided with a secondary transfer roller 511 disposed pressed against the toner image holding face of the intermediate transfer belt 56, and the backup roller 512 that is disposed on the back face of the intermediate transfer belt 56 to form an opposite electrode of the secondary transfer roller 511. A metal feed roller 513 to which a secondary transfer bias is stably applied is disposed in contact with the backup roller 512. Additionally, a brush roller 514 that removes unwanted material adhering to the secondary transfer roller 511 is disposed in contact with the secondary transfer roller 511.

Also, on the downstream side of the secondary transfer roller 511, a belt cleaner 521 that cleans the surface of the intermediate transfer belt 56 after the secondary transfer is provided.

Furthermore, in the present exemplary embodiment, as a medium transport system, there are provided a medium container 530 that contains the medium P, a pickup roller 531 that picks up and transports the medium P accumulated in the medium container 530, a transport roller 532 that transports the medium P sent by the pickup roller 531, a medium transport path 533 that supplies the medium P transported by the transport roller 532 to a secondary transfer position of the secondary transfer device 510, and a transport belt 534 that transports the medium P after the secondary transfer to the fusing device 540.

Overview of Exemplary Embodiment

FIGS. 4A and 4B are diagrams illustrating a print order of a white toner image when forming an image on a medium by the image forming device 50.

Of these, FIG. 4A illustrates a print order often seen in the case in which the medium is a transparent medium Pt such as a transparent film. In this print order, a white toner image is formed uppermost on the back side of the transparent medium Pt as seen from a viewpoint V. This print order is realized by the image forming units 51W1, 51Y, 51M, 51C, and 51K. Hereinafter, the print order of such a white toner image is designated "overprinting". Also, the position of the image forming unit 51W1 used for overprinting is denoted "#1".

Also, FIG. 4B illustrates a print order in the case in which the medium is a colored medium Pc such as colored paper. Alternatively, this print order may be taken to be the print order in the case in which the medium is the transparent medium Pt such as a transparent film. In this print order, a white toner image is formed lowermost on the front side of the colored medium Pc or the transparent medium Pt as seen from the viewpoint V. This print order is realized by the image forming units 51Y, 51M, 51C, 51K, and 51W6. Hereinafter, the print order of such a white toner image is designated "underprinting". Also, the position of the image forming unit 51W1 used for underprinting is denoted "#6".

Meanwhile, in the present exemplary embodiment, it is presupposed that, in order to obtain concealment, white toner is designed to have large toner particles compared to color toner. Under such a presupposition, if color toner is laid on top of white toner, the color toner sinks in between the white toner, hue curving occurs, and color reproduction is degraded.

Also, the hue curves differently depending on the print order of white toner.

Figure 5:
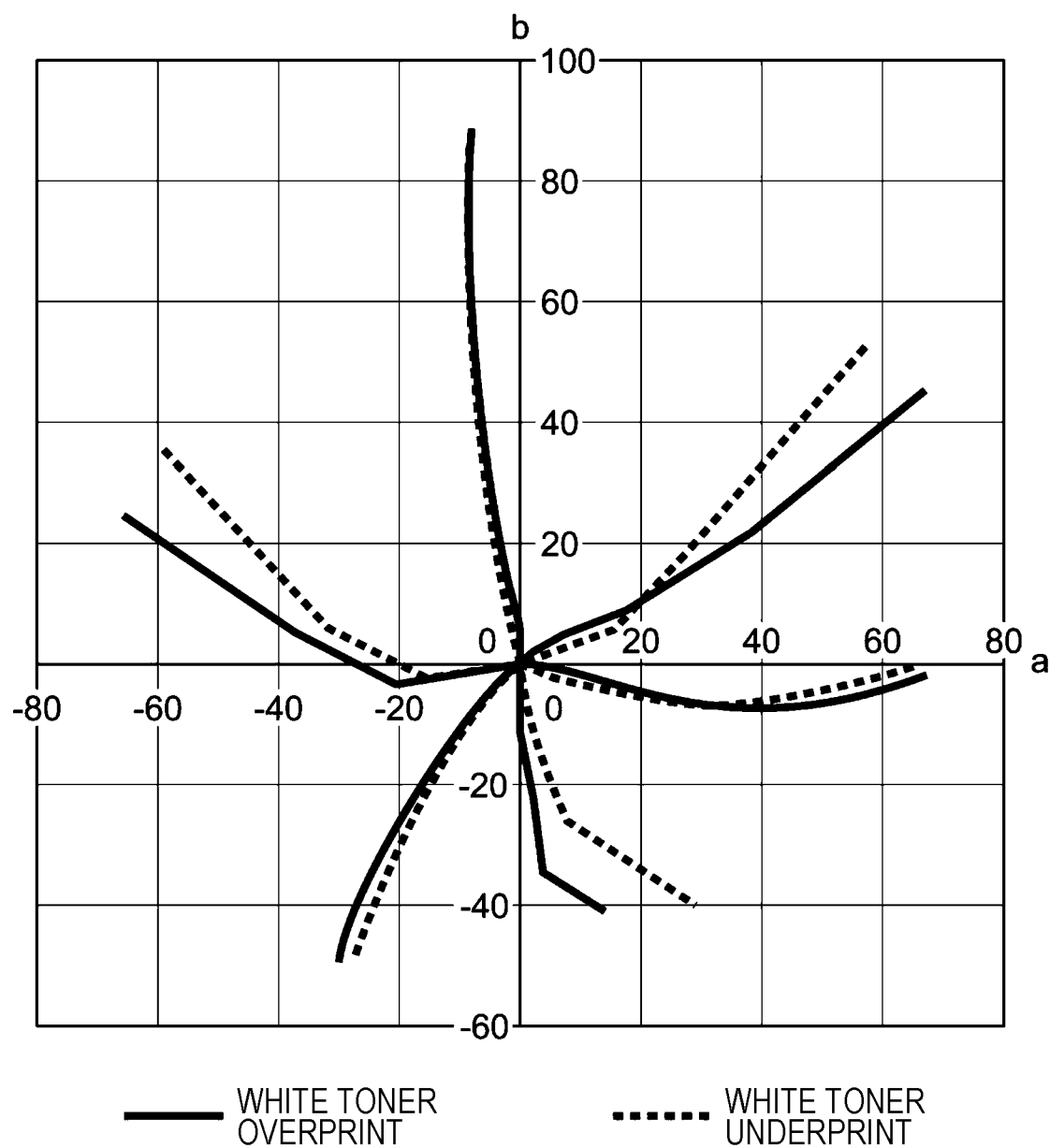
FIG. 5 is a graph illustrating how hue curves differently depending on the print order of white toner.

FIG. 5 is a graph illustrating this phenomenon. The graph plots, on the ab plane, the hue obtained while varying toner quantities of yellow (Y), magenta (M), and cyan (C) for each of the case of overprinting white toner on a transparent film, and the case of underprinting white toner on a transparent film.

For example, in the case of overprinting white toner on a transparent film, the line connecting the hues in the case in which the toner quantities of yellow (Y) and magenta (M) are set to the same and the toner quantity of cyan (C) is set to 0 is illustrated by the solid line in the red (R) region, the line connecting the hues in the case in which the toner quantities of yellow (Y) and cyan (C) are set to the same and the toner quantity of magenta (M) is set to 0 is illustrated by the solid line in the green (G) region, and the line connecting the hues in the case in which the toner quantities of cyan (C) and magenta (M) are set to the same and the toner quantity of yellow (Y) is set to 0 is illustrated by the solid line in the blue (B) region.

Also, in the case of underprinting white toner on a transparent film, the line connecting the hues in the case in which the toner quantities of yellow (Y) and magenta (M) are set to the same and the toner quantity of cyan (C) is set to 0 is illustrated by the dashed line in the red (R) region, the line connecting the hues in the case in which the toner quantities of yellow (Y) and cyan (C) are set to the same and the toner quantity of magenta (M) is set to 0 is illustrated by the dashed line in the green (G) region, and the line connecting the hues in the case in which the toner quantities of cyan (C) and magenta (M) are set to the same and the toner quantity of yellow (Y) is set to 0 is illustrated by the dashed line in the blue (B) region.

The graph demonstrates that for the primary colors, there is little difference in how the hue curves between the case of overprinting and the case of underprinting white toner, but for the secondary colors, the way the hue curves is greatly different between the case of overprinting and the case of underprinting white toner. This is because toner of different colors sinks in between white toner depending on the print order of the white toner.

Figure 6A:
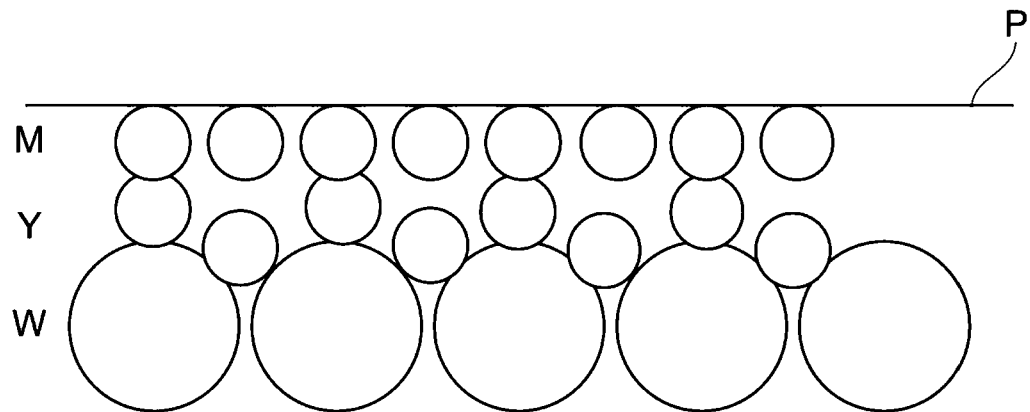
FIGS. 6A and 6B are diagrams illustrating how toner of different colors sinks in between white toner depending on the print order of white toner.
Figure 6B:
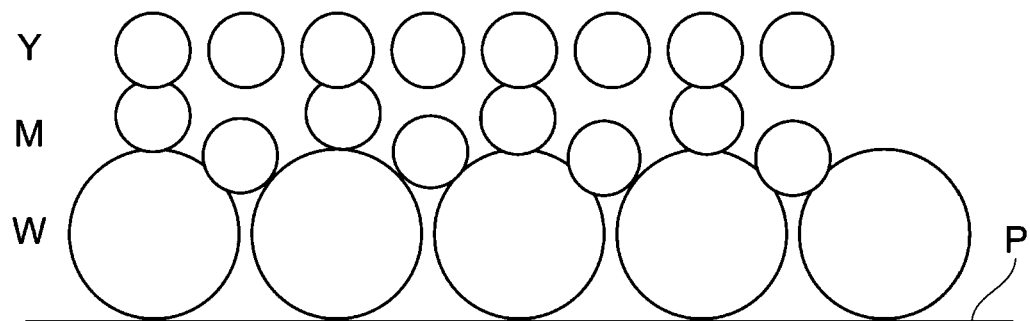

FIGS. 6A and 6B are diagrams illustrating how toner of different colors sinks in between white toner depending on the print order of white toner, taking as an example the case of forming a red image on the medium P with yellow toner and magenta toner. Of these, FIG. 6A is the case of overprinting white toner, in which the yellow toner sinks in between the white toner. On the other hand, FIG. 6B is the case of underprinting white toner, in which the magenta toner sinks in between the white toner.

Accordingly, in the present exemplary embodiment, a profile for the case of overprinting white toner and a profile for the case of underprinting white toner are created, and the profile is switched depending on the print order of white toner.

Since the image forming unit 51W1 is used in the case of overprinting white toner and the image forming unit 51W6 is used in the case of underprinting white toner, the above may be considered to be converting colors in the image by using profiles corresponding to the positional relationship between the image forming units 51W1 and 51W6 that form images with white toner on the medium, and the image forming units 51Y, 51M, 51C, and 51K that form images with color toner on the medium. Alternatively, the above may be further generalized to a higher-level concept and considered to be converting colors in the image depending on the positional relationship between the image forming units 51W1 and 51W6 that form images with white toner on the medium, and the image forming units 51Y, 51M, 51C, and 51K that form images with color toner on the medium.

Herein, white toner is one example of a white color material, the image forming unit 51W1 is one example of a white image forming section and a first white image forming section, and the image forming unit 51W6 is one example of a white image forming section and a second white image forming section. Additionally, color toner is one example of colored color material, and the image forming units 51Y, 51M, 51C, and 51K are one example of color image forming sections. Furthermore, a profile is one example of color conversion information.

[Functional Configuration of Print Server]

Figure 7:
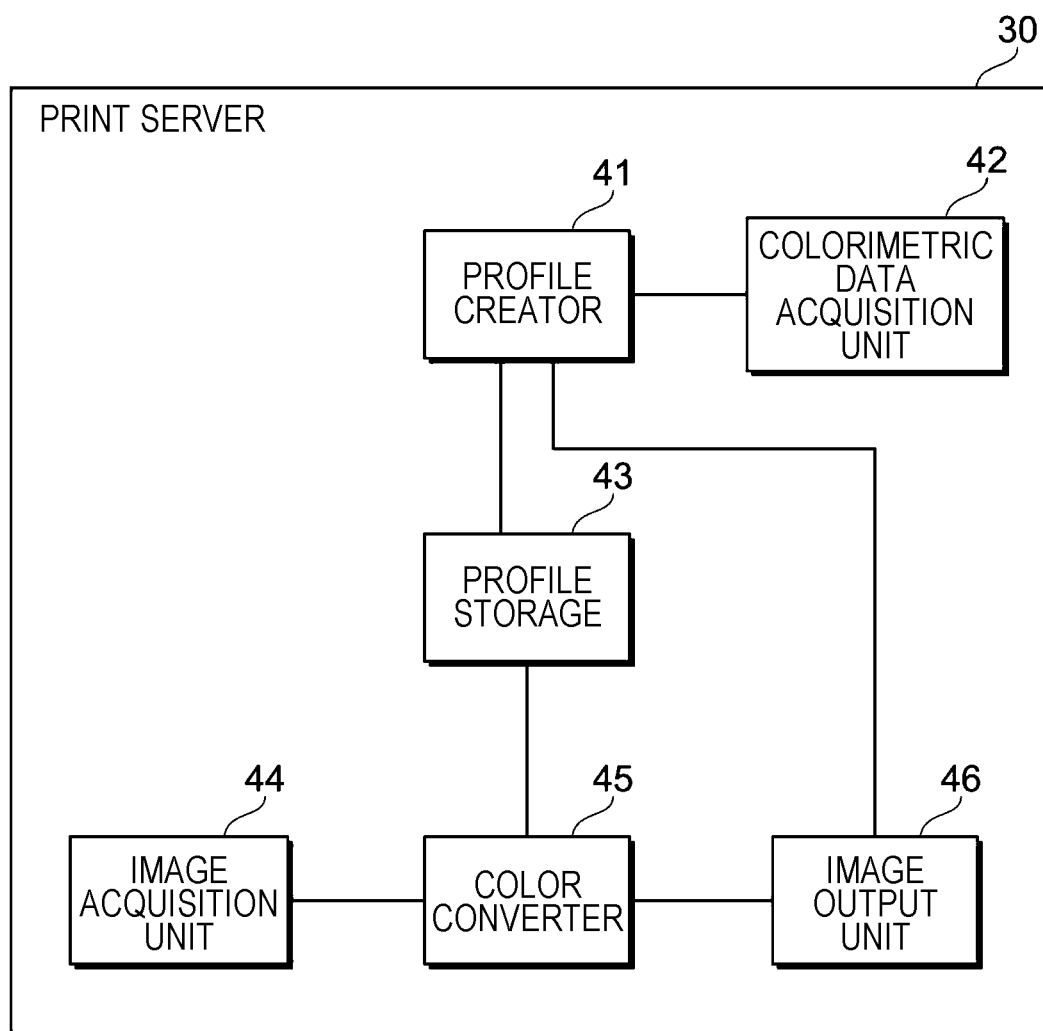
FIG. 7 is a block diagram illustrating an exemplary functional configuration of a print server according to an exemplary embodiment of the present invention.

FIG. 7 is a block diagram illustrating an exemplary functional configuration of the print server 30 according to the present exemplary embodiment. As illustrated in the diagram, the print server 30 is provided with a profile creator 41, a colorimetric data acquisition unit 42, profile storage 43, an image acquisition unit 44, a color converter 45, and an image output unit 46.

The profile creator 41 receives a selection of the position of the image forming unit 51W for white toner, and a selection of the medium container 530. Subsequently, the image forming device 50 uses the image forming unit 51W for white toner at the selected position, and instructs the image output unit 46 to output a chart image to the image forming device 50 such that a chart image is formed by white (W), yellow (Y), magenta (M), cyan (C), and black (K) on the medium contained in the selected medium container 530. Additionally, the colorimetric data acquisition unit 42 is instructed to acquire color features (hereinafter called "colorimetric data") obtained by the colorimetric sensor 550 of the image forming device 50 from the chart image formed on the medium. With this arrangement, a profile associating the position of the selected image forming unit 51W for white toner with the type of medium contained in the selected medium container 530 is created.

The colorimetric data acquisition unit 42 acquires colorimetric data acquired by the colorimetric sensor 550 of the image forming device 50 via the communication link 80. Alternatively, colorimetric data acquired by a colorimetric device other than the colorimetric sensor 550 of the image forming device 50 may be acquired.

The profile storage 43 stores profiles created by the profile creator 41.

The image acquisition unit 44 acquires an image obtained by rasterizing print instruction data received from the terminal device 10. In the present exemplary embodiment, the image acquisition unit 44 is provided as one example of an image acquirer that acquires an image to print on a medium.

The color converter 45 acquires a profile to use for color conversion from among the profiles stored in the profile storage 43.

Specifically, in the case of using the image forming units 51W1, 51Y, 51M, 51C, and 51K, a profile to be used when overprinting white toner (hereinafter called the "white toner overprint profile") is acquired, whereas in the case of using the image forming units 51Y, 51M, 51C, 51K, and 51W6, a profile to be used when underprinting white toner (hereinafter called the "white toner underprint profile") is acquired. Also, in the case in which image forming units 51 for toner other than white toner are installed in #1 and #6, or in the case of using only the image forming units 51Y, 51M, 51C, and 51K even when the image forming units 51W1 and 51W6 are installed in #1 and #6, a profile to be used when using only CMYK toner (hereinafter called the "CMYK-only profile") is acquired. In the present exemplary embodiment, the positional relationship of the image forming units 51W1, 51Y, 51M, 51C, and 51K is used as one example of a first positional relationship, and the positional relationship of the image forming units 51Y, 51M, 51C, 51K, and 51W6 is used as one example of a second positional relationship. Also, the white toner overprint profile is used as one example of first color conversion information, and the white toner underprint profile is used as one example of second color conversion information.

Also, in some cases the color converter 45 acquires a profile when triggered by the position of the image forming unit 51W for white toner (hereinafter called the "white toner engine position"), while in other cases the color converter 45 acquires a profile when triggered by the type of medium. In the case of acquiring a profile when triggered by the white toner engine position, a selection of whether to overprint or underprint white toner is received, and depending on this selection, the image forming unit 51W for white toner to use from among the image forming units 51W1 and 51W6 for white toner is specified, and a profile to be used when using the specified image forming unit 51W for white toner is acquired. In the case of acquiring a profile when triggered by the type of medium, a selection of the medium container 530 is received, and depending on the type of medium contained in the medium container 530, the image forming unit 51W for white toner to use from among the image forming units 51W1 and 51W6 for white toner is specified, and a profile to be used when using the specified image forming unit 51W for white toner is acquired. In the present exemplary embodiment, the color converter 45 is provided as one example of a specifier that specifies a white image forming section from among the first white image forming section and the second white image forming section. Also, whether to overprint or underprint white toner is used as one example of a vertical relationship between an image formed by white color material on a medium and an image formed by colored color material on the medium, and the type of medium is used as one example of a classification of medium.

Additionally, when a profile is acquired, the color converter 45 may also display identification information such as the name of the profile. In the present exemplary embodiment, the color converter 45 is also provided as one example of an information output unit that, before the color in an image is converted, outputs identification information identifying the first color conversion information in the case in which the positional relationship is the first positional relationship, and outputs identification information identifying the second color conversion information in the case in which the positional relationship is the second positional relationship.

Furthermore, the color converter 45 executes color conversion using the acquired profile on the image acquired by the image acquisition unit 44. In the present exemplary embodiment, the color converter 45 is provided as one example of a color converter that converts the colors in an image.

The image output unit 46 transmits the image color-converted by the color converter 45 included in print data to the image forming device 50. In the present exemplary embodiment, the image output unit 46 is provided as one example of an image output unit that outputs a color-converted image.

[Operations of Print Server]

(Operations During Profile Creation)

Figure 8:
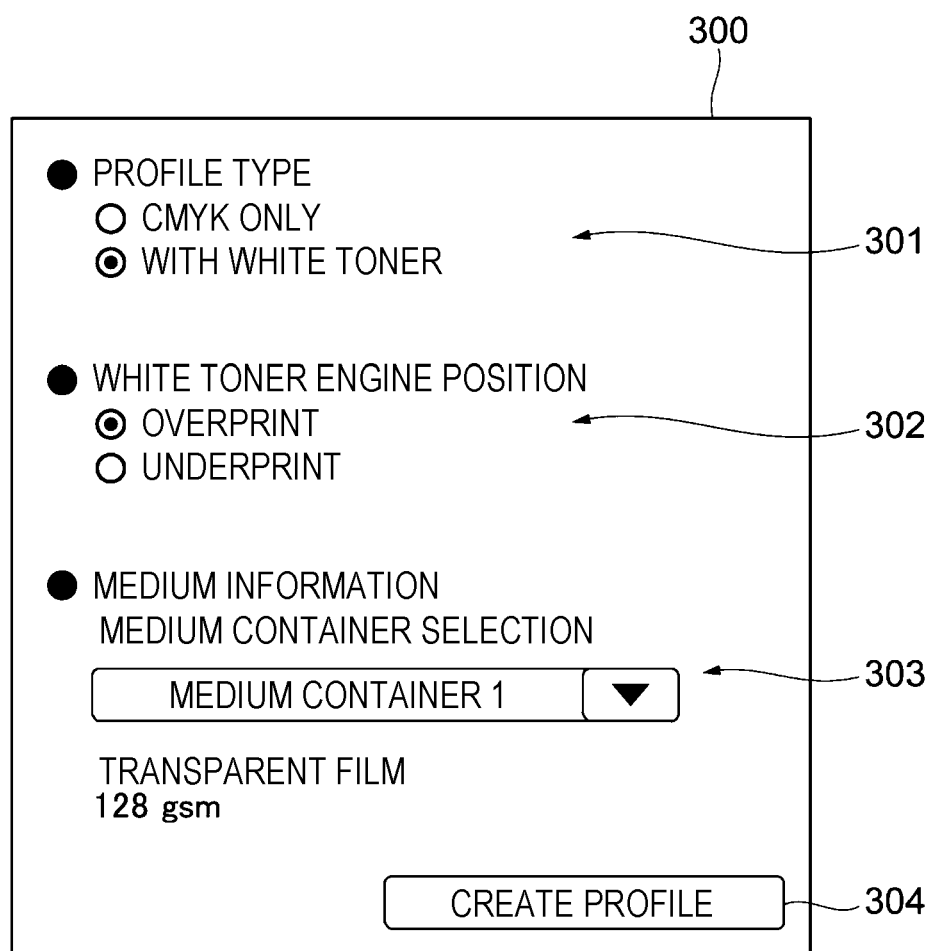
FIG. 8 is a diagram illustrating an example of a profile creation screen that the print server displays during profile creation according to an exemplary embodiment of the present invention.

FIG. 8 is a diagram illustrating an example of a profile creation screen 300 that the print server 30 displays on the display device 35 during profile creation. As illustrated in the diagram, the profile creation screen 300 includes selection items 301, 302, and 303, and also a button 304.

Among these, the selection item 301 is a selection item for selecting whether the type of profile to create is the profile in the case of using CMYK toner only or the profile in the case of using white toner. The selection item 302 is a selection item for selecting whether the white toner engine position is the position (#1) for overprinting or the position (#6) for underprinting. The selection item 303 is a selection item for selecting which medium container 530 to use from among multiple medium containers 530.

Also, the button 304 is a button for carrying out the creation of a profile using the information selected in the selection items 301, 302, and 303.

Figure 9:
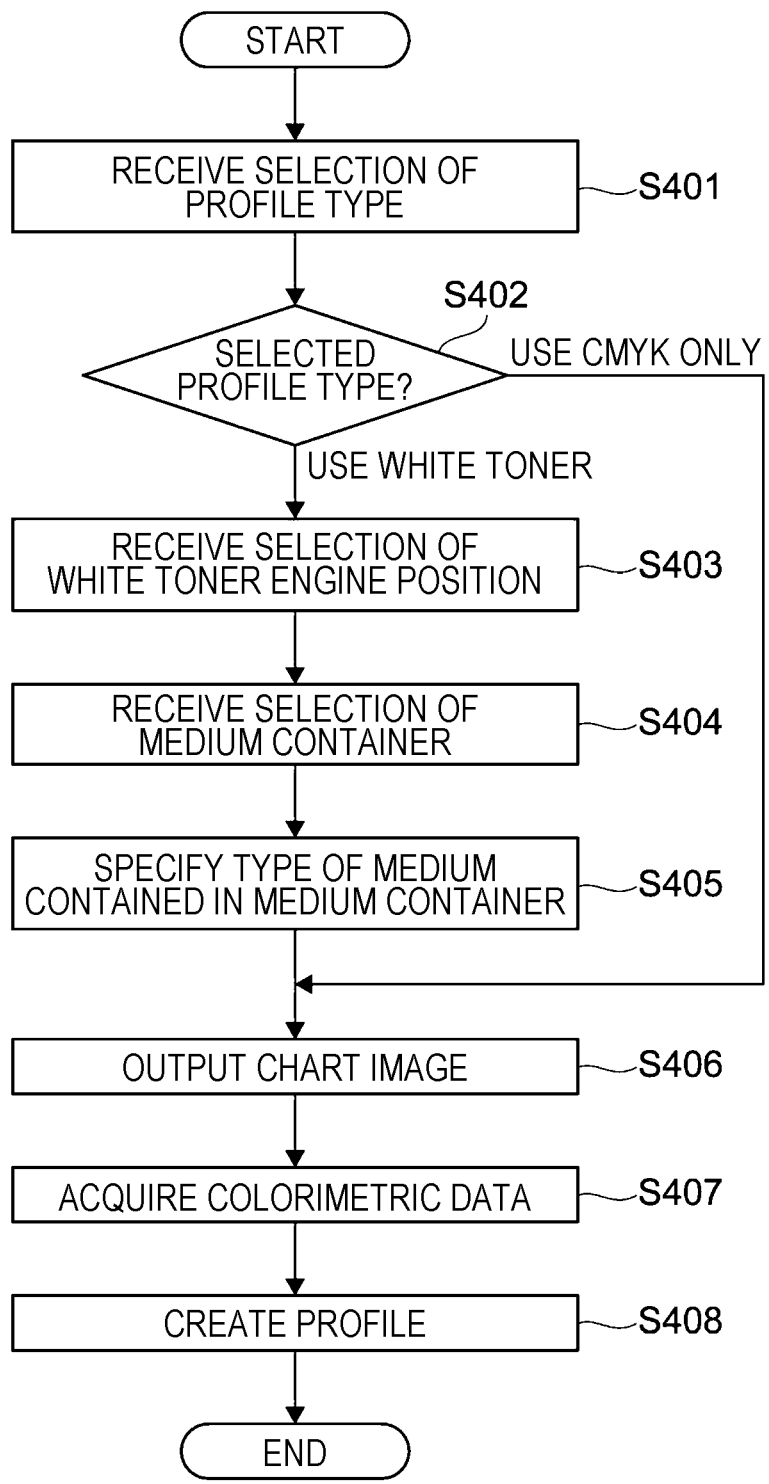
FIG. 9 is a flowchart illustrating exemplary operations during profile creation of the print server according to an exemplary embodiment of the present invention.

FIG. 9 is a flowchart illustrating exemplary operations during profile creation of the print server 30. Note that these operations are started by pressing the button 304 in FIG. 8.

In the print server 30, first, the profile creator 41 receives the selection of the type of profile performed with respect to the selection item 301 (step 401). Additionally, it is determined whether the selected type of profile is one for the case of using white toner or one for the case of using CMYK toner only (step 402).

As a result, if it is determined that the selected type of profile is one for the case of using white toner, the profile creator 41 receives the selection of the white toner engine position performed with respect to the selection item 302 (step 403). Also, the profile creator 41 receives the selection of the medium container 530 performed with respect to the selection item 303 (step 404). Herein, assume that the print server 30 holds medium stock information indicating what types of media are contained in each medium container 530 of the image forming device 50. Accordingly, the profile creator 41 references the medium stock information to specify the type of medium contained in the medium container 530 selected in step 404 (step 405). Subsequently, the profile creator 41 advances the process to step 406.

On the other hand, if it is determined that the selected type of profile is one for the case of using CMYK toner only, the profile creator 41 advances the process to step 406, without executing steps 403 to 405.

Subsequently, according to the instructions of the profile creator 41, the image output unit 46 outputs a chart image using white (W), yellow (Y), magenta (M), cyan (C), and black (K) to the image forming device 50 (step 406).

With this arrangement, the image forming device 50 forms the chart image on a medium. At this time, the colorimetric sensor 550 of the image forming device 50 obtains colorimetric data by colorimetrically measuring the medium on which the chart image is formed. Alternatively, a colorimetric device other than the colorimetric sensor 550 of the image forming device 50 may be configured to obtain colorimetric data by colorimetrically measuring the medium on which the chart image is formed. Subsequently, in the print server 30, the colorimetric data acquisition unit 42 acquires the colorimetric data obtained in this way (step 407).

After that, the profile creator 41 creates a profile (step 408). Specifically, if it is determined in step 402 that the selected type of profile is one for the case of using white toner, a profile associating the white toner engine position selected in step 403 and the type of medium specified in step 405 is created. Note that, in the case in which the profile created here is associated with the engine position #1, the profile corresponds to the white toner overprint profile described above, whereas in the case in which the profile created here is associated with the engine position #6, the profile corresponds to the white toner underprint profile described above. Also, in the case of determining in step 402 that the selected type of profile is one for the case of using CMYK toner only, a profile is created without making such an association. Note that the profile created here corresponds to the CMYK-only profile described above.

Note that the profile created in this way is stored in the profile storage 43.

(Operations when Using Profile Triggered by White Toner Engine Position)

Figure 10:
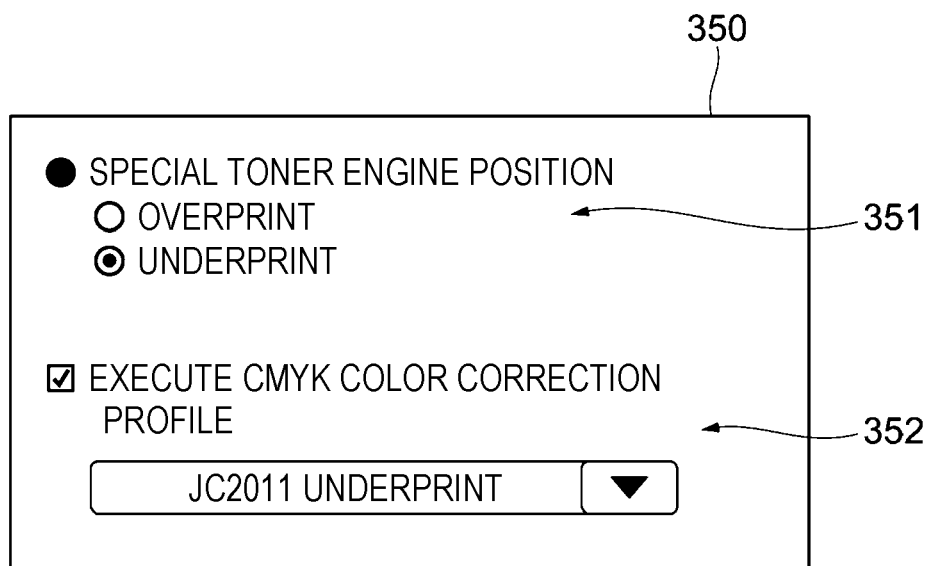
FIG. 10 is a diagram illustrating an example of a profile selection screen that the print server displays when using a profile triggered by a white toner engine position according to an exemplary embodiment of the present invention.

FIG. 10 is a diagram illustrating an example of a profile selection screen 350 that the print server 30 displays on the display device 35 when using a profile triggered by the white toner engine position. As illustrated in the diagram, the profile creation screen 350 includes selection items 351 and 352.

Among these, the selection item 351 is a selection item for selecting the position of the image forming unit 51 for special toner (hereinafter called the "special toner engine position"). The selection item 352 is a selection item for selecting a profile to use. In the present exemplary embodiment, when the special toner engine position is selected in the selection item 351, a profile corresponding to the special toner engine position is displayed selected in the selection item 352, thereby reducing complexity due to the user manually selecting the profile to use from among a large number of profiles.

Figure 11:
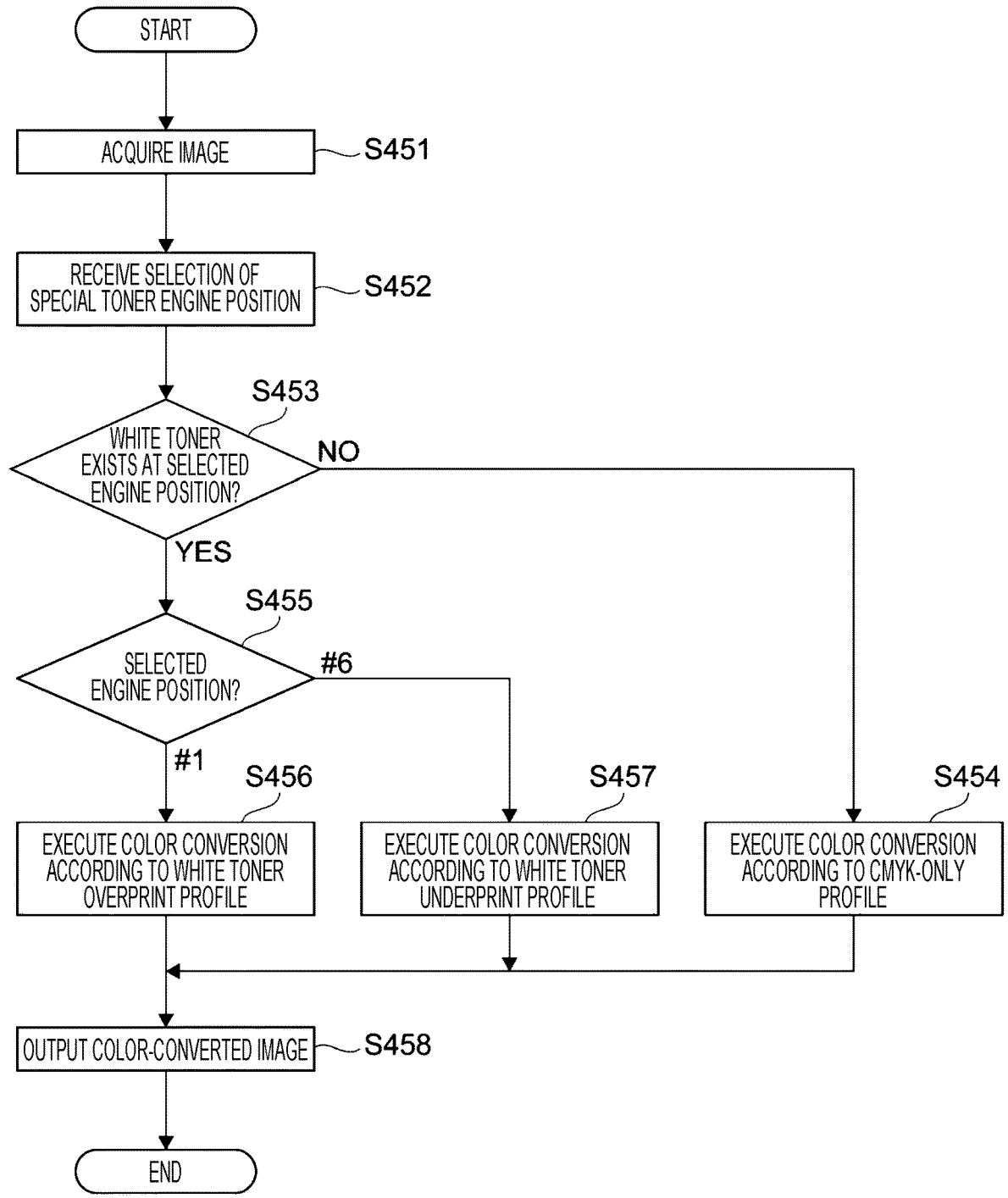
FIG. 11 is a flowchart illustrating exemplary operations of the print sever when using the profile triggered by the white toner engine position according to an exemplary embodiment of the present invention.

FIG. 11 is a flowchart illustrating exemplary operations of the print sever 30 when using the profile triggered by the white toner engine position.

In the print server 30, first, the image acquisition unit 44 acquires an image obtained by rasterizing print instruction data (step 451).

Next, the color converter 45 receives the selection of a special toner engine position performed with respect to the selection item 351 (step 452). Additionally, it is determined whether or not the image forming unit 51W for white toner is installed at the selected engine position (step 453).

As a result, if it is determined that the image forming unit 51W for white toner is not installed at the selected engine position, the color converter 45 executes color conversion using the CMYK-only profile from among the profiles stored in the profile storage 43 (step 454).

On the other hand, if it is determined that the image forming unit 51W for white toner is installed at the selected engine position, the color converter 45 determines whether the selected engine position is #1 or #6 (step 455). Subsequently, if it is determined that the selected engine position is #1, the color converter 45 executes color conversion using the white toner overprint profile (step 456). At this time, the name of the white toner overprint profile may be displayed in the selection item 352. Also, if it is determined that the selected engine position is #6, the color converter 45 executes color conversion using the white toner underprint profile (step 457). At this time, the name of the white toner underprint profile may be displayed in the selection item 352.

After that, the image output unit 46 outputs the image subjected to color conversion in step 454, step 456, or step 457 to the image forming device 50 (step 458).

(Operations when Using Profile Triggered by Type of Medium)

Figure 12:
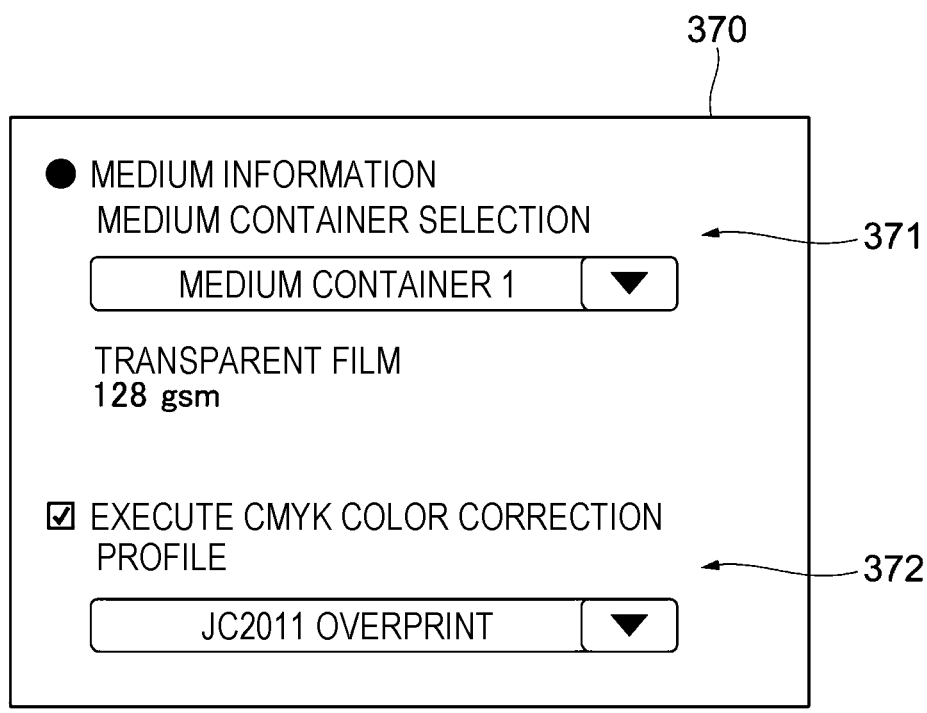
FIG. 12 is a diagram illustrating an example of a profile selection screen that the print server displays when using a profile triggered by a type of media according to an exemplary embodiment of the present invention.

FIG. 12 is a diagram illustrating an example of a profile selection screen 370 that the print server 30 displays on the display device 35 when using a profile triggered by the type of medium. As illustrated in the diagram, the profile creation screen 370 includes selection items 371 and 372.

Among these, the selection item 371 is a selection item for selecting the medium container 530. The selection item 372 is a selection item for selecting a profile to use. In the present exemplary embodiment, when the medium container 530 is selected in the selection item 371, a profile corresponding to a white toner engine position suitable for the type of medium contained in the medium container 530 is displayed selected in the selection item 372, thereby reducing complexity due to the user manually selecting the profile to use from among a large number of profiles.

Figure 13:
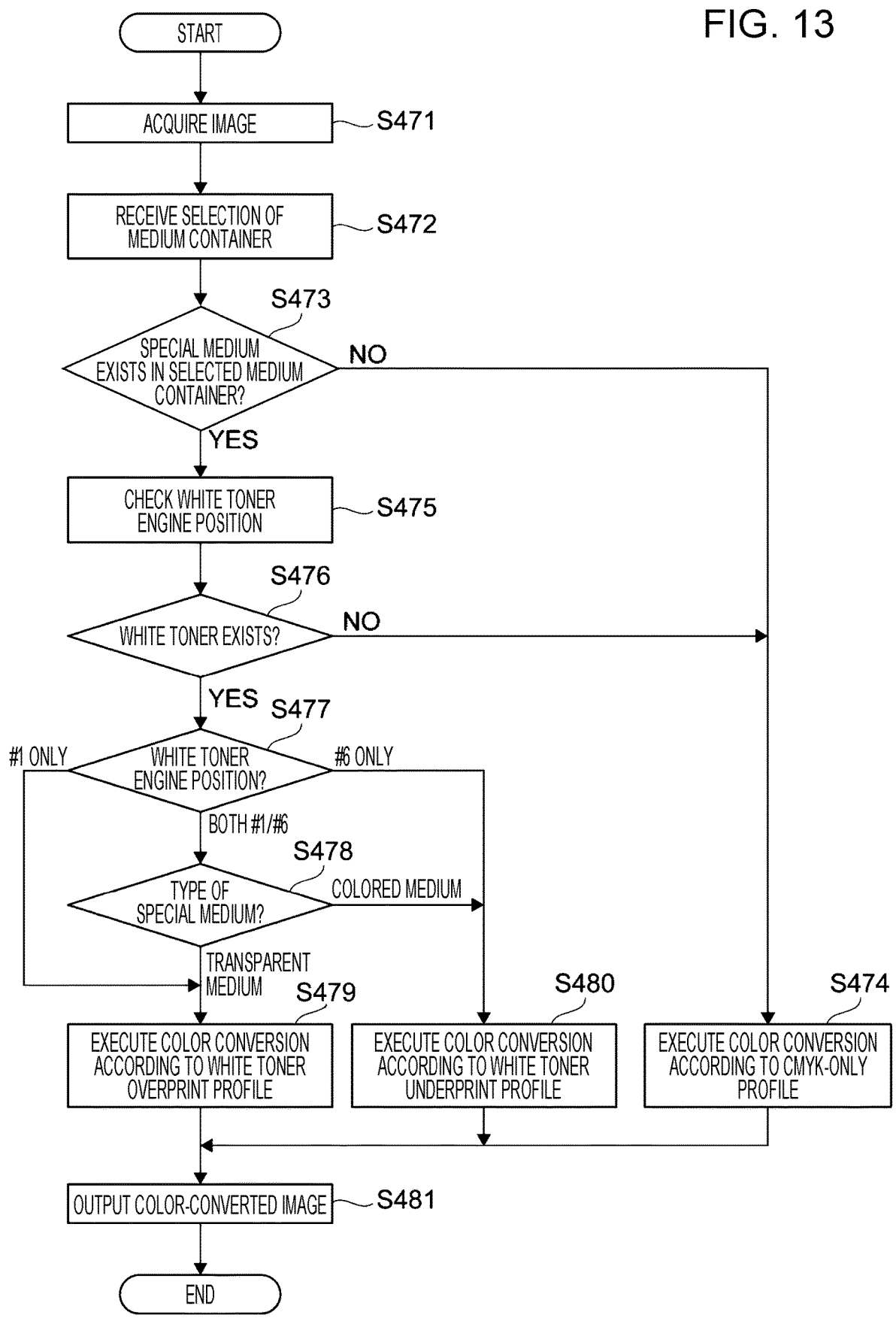
FIG. 13 is a flowchart illustrating exemplary operations of the print sever when using the profile triggered by the type of media according to an exemplary embodiment of the present invention.

FIG. 13 is a flowchart illustrating exemplary operations of the print sever 30 when using the profile triggered by the type of medium.

In the print server 30, first, the image acquisition unit 44 acquires an image obtained by rasterizing print instruction data (step 471).

Next, the color converter 45 receives the selection of a medium container 530 performed with respect to the selection item 371 (step 472). Additionally, it is determined whether or not a special medium is contained in the selected medium container 530 (step 473). It is sufficient to make the determination on the basis of the medium stock information indicating what types of media are contained in each medium container 530 of the image forming device 50.

As a result, if it is determined that a special medium is not contained in the selected medium container 530, or in other words, if it is determined that, for example, white paper is contained in the selected medium container 530, the color converter 45 executes color conversion using the CMYK-only profile from among the profiles stored in the profile storage 43 (step 474).

On the other hand, if it is determined that a special medium is contained in the selected medium container 530, the color converter 45 checks the white toner engine position (step 475). Additionally, it is determined whether or not the image forming unit 51W for white toner is installed (step 476). Subsequently, if it is determined that the image forming unit 51W for white toner is not installed, the color converter 45 executes color conversion using the CMYK-only profile from among the profiles stored in the profile storage 43 (step 474). Also, if it is determined that the image forming unit 51W for white toner is installed, the color converter 45 determines the position at which the image forming unit 51W for white toner is installed (step 477).

As a result, if it is determined that the image forming units 51W for white toner are installed at both the #1 and #6 positions, the color converter 45 determines what type of special medium is contained in the selected medium container 530 (step S478). It is sufficient to make the determination on the basis of the medium stock information. Subsequently, if it is determined that the type of special medium is a transparent medium, since white toner is often overprinted, the color converter 45 executes color conversion using the white toner overprint profile from among the profiles stored in the profile storage 43 (step 479). At this time, the name of the white toner overprint profile may be displayed in the selection item 372. Also, if it is determined that the type of special medium is a colored medium, since white toner is underprinted, the color converter 45 executes color conversion using the white toner underprint profile from among the profiles stored in the profile storage 43 (step 480). At this time, the name of the white toner underprint profile may be displayed in the selection item 372.

Also, if it is determined that the image forming unit 51W for white toner is installed at the #1 position only, the color converter 45 executes color conversion using the white toner overprint profile (step 479). At this time, the name of the white toner overprint profile may be displayed in the selection item 372. Also, in this case, if a transparent medium is contained in the medium container 530 selected in step 472, there is no issue since the overprinting normally desired by the user is executed, but if a colored medium is contained in the medium container 530 selected in step 472, the underprinting normally desired by the user is not executed. Consequently, it may be configured such that the processes from step 479 are executed only in the case in which a transparent medium is contained in the medium container 530, whereas the processes from step 479 are not executed in the case in which a colored medium is contained in the medium container 530.

Furthermore, if it is determined that the image forming unit 51W for white toner is installed at the #6 position only, the color converter 45 executes color conversion using the white toner underprint profile (step 480). At this time, the name of the white toner underprint profile may be displayed in the selection item 372. Also, in this case, if a colored medium is contained in the medium container 530 selected in step 472, there is no issue since the underprinting normally desired by the user is executed, but if a transparent medium is contained in the medium container 530 selected in step 472, the overprinting normally desired by the user is not executed. Consequently, it may be configured such that the processes from step 480 are executed only in the case in which a colored medium is contained in the medium container 530, whereas the processes from step 480 are not executed in the case in which a transparent medium is contained in the medium container 530.

After that, the image output unit 46 outputs the image subjected to color conversion in step 474, step 479, or step 480 to the image forming device 50 (step 481).

[Modification of Present Embodiment]

In the foregoing, an image forming device 50 in which six image forming units 51W1, 51Y, 51M, 51C, 51K, and 51W6 are disposed in that order from the upstream side is presupposed, and the profile is switched between the case of using the image forming unit 51W for white toner in the #1 position farthest upstream and the case of using the image forming unit 51W6 for white toner in the #6 position farthest downstream, but the configuration is not limited to the above. An image forming device 50 in which five image forming units 51W, 51Y, 51M, 51C, and 51K are arrangeable may be presupposed, and the profile may be switched between the case in which the image forming unit 51W for white toner is arranged in the #1 position farthest upstream, and the case in which the image forming unit 51W for white toner is arranged in the #5 position farthest downstream. Herein, it is sufficient to achieve the change between the state in which the image forming unit 51W for white toner is arranged in the #1 position farthest upstream and the state in which the image forming unit 51W for white toner is arranged in the #5 position farthest downstream by, for example, interchanging the image forming unit 51W and the image forming unit 51K from the state in which the five image forming units 51W, 51Y, 51M, 51C, and 51K are arranged in that order from the upstream side.

Also, in the foregoing, both the process of creating a profile and the process of performing color conversion using the profile are executed on the print server 30, but at least one of these processes may also be executed on a controller inside the image forming device 50.

[Program]

Processes executed by the print server 30 or a controller of the image forming device 50 according to the present exemplary embodiment are prepared as a program such as application software, for example.

In other words, a program that realizes the present exemplary embodiment may be treated as a program for causing a computer to achieve an image acquisition function of acquiring an image to print onto a medium, a color conversion function of converting color in the image acquired by the image acquisition function depending on a positional relationship between a white image forming section that forms an image on the medium with white color material and a color image forming section that forms an image on the medium with colored color material, and an image output function of outputting the image whose color is converted by the color conversion function.

Note that a program realizing an exemplary embodiment obviously may be provided via a communication medium, and may also be provided by being stored on a recording medium such as CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
an image acquirer that acquires an image to print onto a medium;
a color converter that converts color in the image acquired by the image acquirer, wherein
the color converter switches profiles depending on a print order of white toner, and
the profiles include at least a first profile for a case of overprinting the white toner and a second profile for a case of underprinting the white toner; and
an image output unit that outputs the image whose color is converted by the color converter.

2. The information processing device according to claim 1, wherein
the color converter converts color in the image acquired by the image acquirer depending on a positional relationship between a white image forming section that forms an image on the medium with white color material and a color image forming section that forms an image on the medium with colored color material, and
the positional relationship is one of a first positional relationship in which the white image forming section is on an upstream side of the color image forming section, and a second positional relationship in which the white image forming section is on a downstream side of the color image forming section.

3. The information processing device according to claim 2, wherein
the color converter converts color in the image acquired by the image acquirer using color conversion information depending on the positional relationship, and converts color in the image acquired by the image acquirer using first color conversion information as the color conversion information in a case in which the positional relationship is the first positional relationship, and using second color conversion information different from the first color conversion information as the color conversion information in a case in which the positional relationship is the second positional relationship.

4. The information processing device according to claim 3, further comprising:
an information output unit that, before the color in the image acquired by the image acquirer is converted by the color converter, outputs identification information identifying the first color conversion information in the case in which the positional relationship is the first positional relationship, and outputs identification information identifying the second color conversion information in the case in which the positional relationship is the second positional relationship.

5. The information processing device according to claim 1, wherein
the color converter converts color in the image acquired by the image acquirer depending on a positional relationship between a white image forming section that forms an image on the medium with white color material and a color image forming section that forms an image on the medium with colored color material, and
the information processing devices further comprises:
a specifier that specifies the white image forming section from among a first white image forming section on an upstream side of the color image forming section, and a second white image forming section on a downstream side of the color image forming section.

6. The information processing device according to claim 5, wherein
the specifier specifies the white image forming section depending on a vertical relationship between an image formed by the white color material on the medium and an image formed by the colored color material on the medium.

7. The information processing device according to claim 6, wherein
the specifier specifies the first white image forming section as the white image forming section in a case in which the vertical relationship indicates that the image formed by the white color material on the medium is above the image formed by the colored color material on the medium.

8. The information processing device according to claim 6, wherein
the specifier specifies the second white image forming section as the white image forming section in a case in which the vertical relationship indicates that the image formed by the white color material on the medium is below the image formed by the colored color material on the medium.

9. The information processing device according to claim 5, wherein
the specifier specifies the white image forming section depending on a classification of the medium.

10. The information processing device according to claim 9, wherein
the specifier specifies the first white image forming section as the white image forming section in a case in which the classification of the medium indicates a transparent medium.

11. The information processing device according to claim 9, wherein
the specifier specifies the second white image forming section as the white image forming section in a case in which the classification of the medium indicates a colored medium.

12. A non-transitory computer readable medium storing a program causing a computer to execute a process for processing information, the process comprising:
acquiring an image to print onto a medium;
converting color in the acquired image;
switching profiles depending on a print order of white toner, wherein
the profiles include at least a first profile for a case of overprinting the white toner and a second profile for a case of underprinting the white toner; and
outputting the image whose color is converted.

13. An information processing device comprising:
image acquiring means for acquiring an image to print onto a medium;
color converting means for converting color in the image acquired by the image acquiring means, wherein
the color converting means switches profiles depending on a print order of white toner, and
the profiles include at least a first profile for a case of overprinting the white toner and a second profile for a case of underprinting the white toner; and image output means for outputting the image whose color is converted by the color converting means.

* * * * *